United States Patent [19]
Yoshida

[11] Patent Number: 5,204,515
[45] Date of Patent: Apr. 20, 1993

[54] METHOD OF READING IDENTIFICATION CODE SHEETS USING BORDERS TO DETERMINE SCAN ANGLE

[75] Inventor: Hirokazu Yoshida, Osaka, Japan
[73] Assignee: Teiryo Sangyo Co., Ltd., Osaka, Japan
[21] Appl. No.: 774,146
[22] Filed: Oct. 15, 1991

Related U.S. Application Data
[63] Continuation of Ser. No. 217,843, Jul. 11, 1988, abandoned.

[30] Foreign Application Priority Data
Jul. 11, 1987 [JP] Japan .................. 62-173352
Sep. 17, 1987 [JP] Japan .................. 62-232983

[51] Int. Cl.$^5$ .................. G06K 7/10; G06K 19/06
[52] U.S. Cl. .................. 235/456; 235/460; 235/470; 235/494; 382/48; 382/61
[58] Field of Search .................. 235/494, 487, 460, 461, 235/462, 463, 466, 454, 456; 382/48, 61

[56] References Cited
U.S. PATENT DOCUMENTS

| | | | |
|---|---|---|---|
| 2,820,907 | 7/1951 | Silverman | 235/454 |
| 3,632,995 | 1/1972 | Wilson | 235/494 |
| 3,835,297 | 9/1974 | Inoue et al. | 235/487 |
| 4,213,040 | 7/1980 | Gokey et al. | 235/476 |
| 4,263,504 | 4/1981 | Thomas | 235/454 |
| 4,270,043 | 5/1981 | Baxter et al. | 235/455 |
| 4,275,381 | 6/1981 | Siegal | 235/495 |
| 4,534,031 | 8/1985 | Jewer | 369/93 |
| 4,588,882 | 5/1986 | Buxton | 235/487 |
| 4,589,144 | 5/1986 | Namba | 382/61 |
| 4,724,322 | 2/1988 | Knowles et al. | 250/341 |
| 4,748,679 | 5/1988 | Gold et al. | 235/380 |
| 4,760,247 | 7/1988 | Keane et al. | 235/456 |
| 4,776,464 | 10/1988 | Miller et al. | 235/462 |
| 4,782,221 | 11/1988 | Brass et al. | 235/454 |
| 4,786,792 | 11/1988 | Pierce et al. | 235/454 |
| 4,811,321 | 3/1989 | Enari et al. | 360/49 |
| 4,814,594 | 3/1989 | Drexler | 235/454 |
| 4,818,852 | 4/1989 | Haddock et al. | 235/462 |
| 4,822,986 | 4/1989 | Guthmueller et al. | 235/462 |
| 4,857,715 | 8/1989 | Koch et al. | 235/470 |
| 4,870,260 | 9/1989 | Niepolomski et al. | 235/454 |
| 4,886,957 | 12/1989 | Glaberson et al. | 235/454 |
| 4,910,725 | 3/1990 | Drexler | 235/494 |
| 4,924,078 | 5/1990 | Sant'Anselmo et al. | 235/456 |
| 4,937,439 | 6/1990 | Wanninger et al. | 235/456 |
| 4,939,354 | 7/1990 | Priddy et al. | 235/462 |
| 4,982,075 | 1/1991 | Aoki et al. | 235/456 |
| 4,982,391 | 1/1991 | Sakagami et al. | 235/454 |
| 4,998,009 | 3/1991 | Iijima et al. | 235/454 |
| 5,004,896 | 4/1991 | Serrell et al. | 235/456 |
| 5,023,923 | 6/1991 | Sanner et al. | 382/61 |

Primary Examiner—Eugene R. LaRoche
Assistant Examiner—Christopher R. Glembocki

[57] ABSTRACT

An identification code sheet includes of codes of merchandise, a character string or a document etc. The sheet can be read by a sensor. The identification code sheet including a representation area defined by both a X-axis and a Y-axis intersecting mutually either orthogonally or skewedly and sub-areas of identification code printed in are representation area. The said representation area is divided into sixteen or more sub-areas, in each of which an identification code of encoded indicia is recorded. With the coding and method much more informations relative to the conventional techniques may be handled and more particularly much more Kana-Kanzi, Arabic and Chinese letters etc. as well as numerical characters, symbols, and alphabets may be represented which can be easily read. The representation of repredentation areas defined by both the X-axis and the Y-axis and the identification code in said sub-areas ensures accuracy and speed of reading by means of a sensor to read the identification code sheet in any direction and further a simplier reading, representation and outputting etc. by use of a printing sheet and printing means for general use.

6 Claims, 8 Drawing Sheets

METHOD OF READING IDENTIFICATION CODE SHEETS USING BORDERS TO DETERMINE SCAN ANGLE

This application is a continuation of application Ser. No. 07/217,843 filed on Jul. 11, 1988, now abandoned.

TECHNICAL FIELD OF THE INVENTION

The invention relates, in general, to an identification code sheet and a method for reading the code sheet, more particularly, the invention relates to to an identification code sheet representing a merchandise code, a character string or a document etc. capable of identifying a numerical character, symbol, an alphabet, a Kana-Kanzi character etc., and to a method of reading the content of identification code from the sheet.

BACKGROUND OF THE INVENTION

Identification code sheets involved in an identification, there are known a bar code and a token code designed to represent a numerical character and/or a symbol.

As well known, the bar code is set up by a plurality of fine and thick bars spaced regularly and combined to represent a numerical character etc. According to the prior art, a sheet of bar code set up by a combination of a plurality of fine and thick bars spaced regularly is characteristically accompanied by drawbacks such as a need of high level techniques of printing on the sheet requiring unnecessarily high level of accuracy for preparation which is very costly.

Another sheet of token code type for binary representation in terms of the locations of punched hole is accompanied by such drawbacks as a need of punching process and a low speed of reading relative to an optical and or magnetic types.

Other drawbacks inherent to the above types of sheet are presently a limited capability of representing only a numerical character and a part of a character string, and a need of re-making the sheet whenever an urgent change of the code content is needed. This change is made by the operators by code printer or a punch installed elsewhere away from the site of operation. Therefore a substantial difficulty is encountered also in the data maintanance, especially for a large scale POS (Point Of Sales system).

There is also another known art represented by reading means to handle an identification code represented by a bar code system, according to U.S. Patent application No.316,936 (Japanese Patent Publication No.21980 of 1978).

According to the above described prior art, bar codes are to be identified as to encoded indicia on the principle of finding both a finess/thickness and a location of the code bars. This often resulting in a high likelihood of inducing reading errors. These types of codes are used mostly to represent, in general, the numerical characters and rarely can handle even the reading of alphabets. For this reason, the realization of these conventional means has not so far been achieved to cover a Kanzi-code under JIS (Japanese Industrial Standard) rule. According to the above described conventional art, there is also an absolute need for an exact reading of a finess/thickness and a location of the bars setting up bar codes. This means a likelihood of occurring reading errors to, depending on misprints of the code bars, elongation/shrinkage of the bar code papers, irregularity of the surfaces on which the bar code papers are to be pasted and a change in the reading angle of a sensor relative to the bar code paper.

More recently, a new method of code-making is being developed, by which 0 to F is represented by coding properly "田" character. It should, however, be noted that "田" character involves, in coding thereof, such unsolved problems as a need for addition thereto of a direction of reading and specification of the same, because of the symmetrical composition of the character in both horizontal and vertical directions.

MEANS OF SOLVING THE PROBLEM AND THEIR EFFECTS

A primary object of the invention is a provision of an identification code sheet and a method of its reading, wherein a representation area is defined by both a X-axis and a Y-axis for representation of an identification code, and in said representation area are provided the sub-areas in which said identification code is recorded by means of encoded indicia. According to the embodiment of the invention, a representation area defined by both the X-axis and the Y-axis is represented on an identification code sheet, and needed encoded indicia are recorded in sub-areas of said representation area, thus providing an identification code. In this manner, an exact reading of the encoded indicia can be attained, without any limitation to the available direction of reading, by virtue of an existence of the representation area, when the identification code is read by means of a sensor to read identification codes.

Another object of the invention is a provision of an identification sheet and a method of reading the sheet, wherein said representation area is divided into at least sixteen or more sub-areas, and in each of the sub-areas said identification code set up by encoded indicia in terms of binary signals is recorded. According to the embodiment of the invention, a large number of data of 2 factorials can be recorded, and any representation in terms of Kana-Kanzi, Thai, Arabic and Chinese letters etc. as well as numerical characters, symbols and alphbets may be provided and read. Represents a sheet of an ordinary quality can be made and read at a very high level of accuracy and speed, without need for use of a paper of special quality, availing only a printing means represented by a printer of general purpose type designed for a microcomputer etc.

Another object of the invention is a provision of an identification code sheet and a method of its reading, wherein sixteen or more sub-areas in said representation area are grouped into four or more assemblies, in which said identification code of $2^4$ or more signal codes is recorded. According to the embodiment of the invention, recording and reading can be accomplished with great versatility, depending on a proper method applied to the selection of the assemblies, thus ensuring an enlargement of an available recording capacity and an ease with which an improved versatilty of grouping into the assemblies and added applicability of converting to cipher as well.

A further object of the invention is a provision of an identification code sheet and a method of reading the code sheet, wherein an auxiliary representation area is provided next to the periphery of said representation area and an auxiliary mark for identification of reading a direction of recorded identification code on said auxiliary representation area is recorded. This type of embodiment enables a finding of a representation area's leading end position, trailing end position and vertical and lateral directions of reading made by a sensor to read identification codes and simplifies the pasting of an identification code sheet and to carry out an interpretation at an improved accuracy and higher speed.

A still further object of the invention is a provision of an identification code sheet and a method of reading the code sheet, wherein separation marks are provided between said sub-areas in said representation area in order to be readily interpreted for discrimination. According to the embodiment, sub-areas can be accurately found by virtue of separation marks to ensure a stabilized interpretation of an identification code, even when there are present an error in printing and an irregularity of the surface of pasting etc.

Further objects and advantages of the present invention will be apparent from the following description, reference being made to the accompanying drawings wherein preferred embodiments of the present invention are clearly shown.

BRIEF DESCRIPTION OF DRAWINGS

FIGS. 2(a), 2(b), 2(c), (d) and 2(e) are plan views showing variations of the embodiments of the invention, related to a representation area in the code sheet described above;

FIG. 3 is a view illustrating sub-area and the assemblies of the invention, related to the representation area described above;

DETAILED DESCRIPTION OF THE INVENTION

The following is the detailed description of the preferred embodiments of the invention relative to the accompanying drawings, wherein the numerals in the different views identify identical parts.

Figure 1:
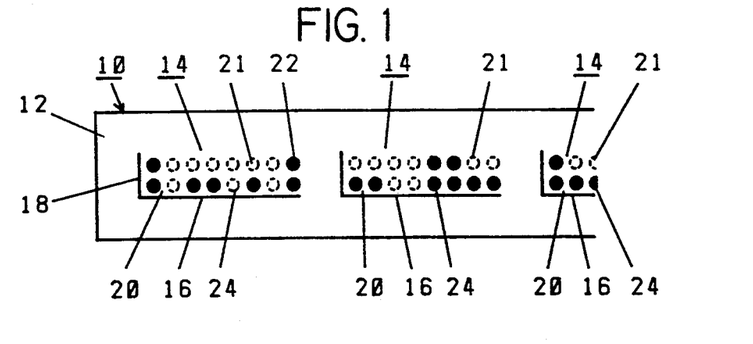
FIG. 1 is a plan view of an identification code sheet representing an embodiment of the invention, with partial cut-away.

In FIG. 1, shows an embodiment of the invention in the form of a strip of identification code sheet 10. The identification code sheet 10 is a strip of code sheet 12 which may be of either paper or plastic film for example. In the center zone of said strip is printed an representation area 14 on the face of the identification code sheet 12. Said representation area 14 includes the representation area 20 definded by a X-axis 16 and a Y-axis 18 in the form orthogonal coordinates encoded indicia are 22 printed to represent identification codes 21 in the representation area 20.

Figures 2A, 2B, 2C, 2D, 2E, 3:
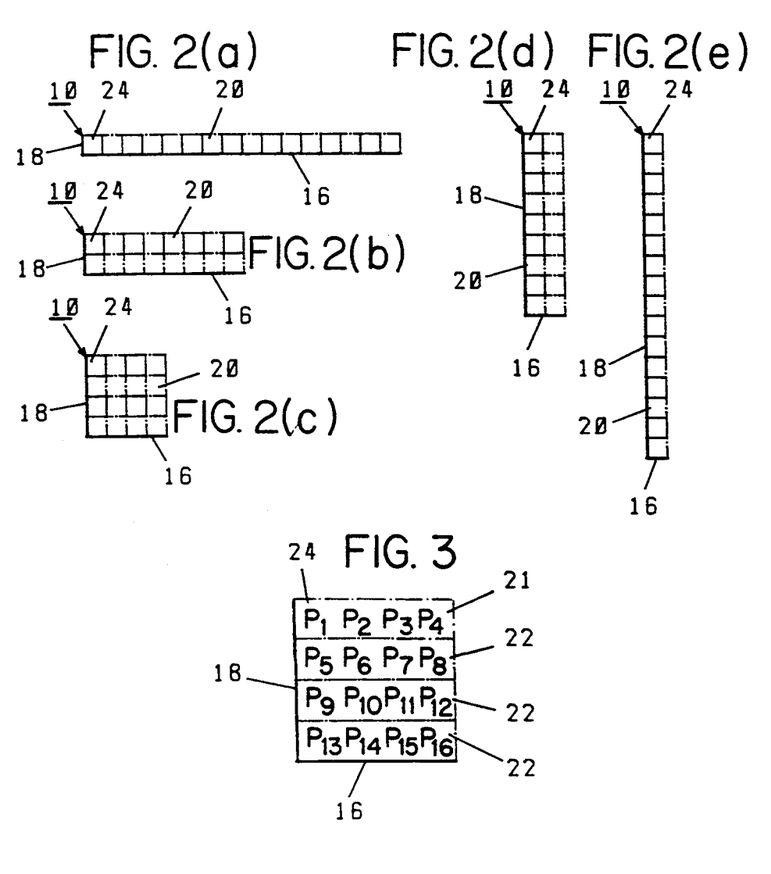

The representation area 20 is sub-divided into sixteen sub-areas 24, in each of which encoded indicia 22 in terms of binary signal codes of 0 or 1 is to be printed. The area 20 may be of various shapes as illustrated in FIG. 2. FIG. 2(a) shows an embodiment where a series of encoded indicia 22 is arranged in a straight line, with length ratio of X-axis 16 to Y-axis 18 of 16:1.

FIG. 2(b) shows another embodiment where a series of encoded indicia 22 is arranged in double straight lines, with X-Y axis length ratio of 4:1. FIG. 2 (c) represents a similar embodiment, with X-Y length ratio of 1:1. FIGS. 2 (d) and 2 (e) give further another embodiment, with X-Y length ratio, contrary to the same of FIGS. 2 (a) and 2 (b) of 4:1 and 16:1 respectively, to form a longitudinal elongated shape of sheet. The shape of the identification code sheet may be changed properly to meet a particular need case by case as may be found necessary.

Figure 4:
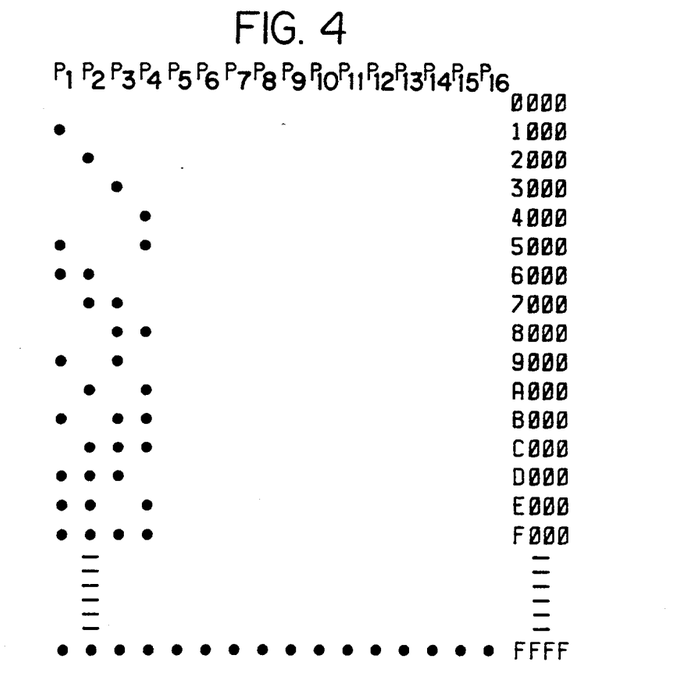
FIG. 4 is a view illustrating a pattern of coding showing the number and the location of the sub-area where encoded indicia is located.
Figure 5:
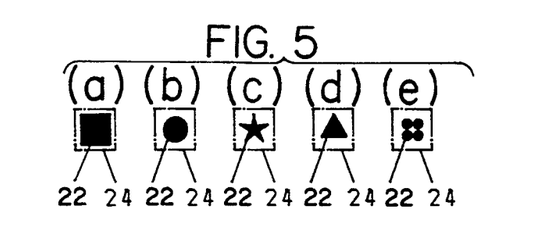
FIGS. 5(a), 5(b), 5(c), 5(d) and 5(e) are detail views showing a concept of the encoded indicia of the invention.

The sub-areas 24 in the representation area 20 are designed, as illustrated in FIG. 3, to provide a record of the identification code 21, according to $2^{16}$ binary codes as represented by 0000, 1000, 2000, ... FFFF as illustrated in FIG. 4, by arranging $P_1$, $P_2$, $P_3$ ... $P_{16}$ in a horizontal row and in an appropriate order and addressing them and subsequently making record, in $P_1$, $P_2$, $P_3$ ... $P_{16}$, of a binary signal of either 0 or 1 as may be found necessary. The encoded indicia 22 to print in the individual sub-areas 24 may have various shapes as shown in FIG. 5. In FIG. 5 (a) is given an example of mark filling up almost totally a sub-area 24 of a rectangular form, while FIGS. 5 (b), (c), (d) and (e) show other marks of round, star, triangle and four-dot combination form, with a blank left in the periphery of said sub-area 24.

Figure 6:
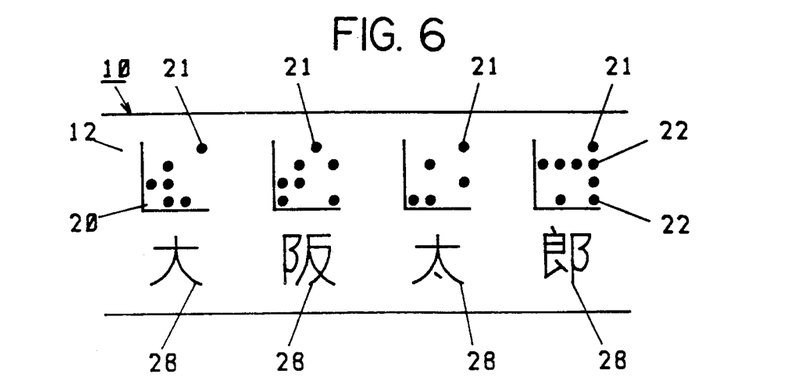
FIG. 6 is a plan view of an identification code sheet comprising the characters mentioned, with partial cut-away.

To produce the representation area 20 and/or the encoded indicia 22 on the identification sheet 10 mentioned above, a suitable printing means of an ordinary type may be applied, and presently commercially available microcomputer a handy computor of 11- or 24-dot type may also be used for the purpose mentioned. For printing, name of merchandize, name of section in charge, office address, name of person, telephon number and any other similar character string, message and statement of advertisement may be converted through the microcomputer, according to JIS rule of coding (or the corresponding similar rule of other countries) and a single representation area 20 of one of $2^{16}$ encoded indicia 22 for every character. For this, it is preferable to have prior representation of the identification code 21 in terms of a character 28 of Kana-Kanzi, English or some other languages as may be found necessary at a location next to the bottom portion or the likes of the representation area 20 for individual encoded indicia 22, as illustrated in FIG. 6, to facilitate a visual confirmation. This enables one identification code to be expressed as a single character just equivalent to a single identification code thus providing a clean representation in parallel as shown in FIG. 6.

Figure 7:
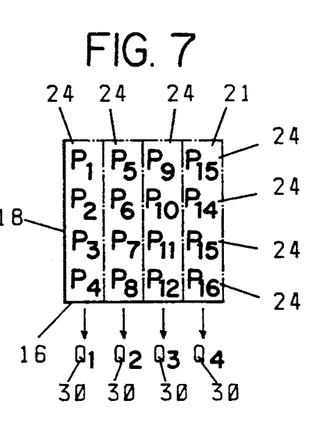
FIG. 7 shows a concept of assemblies representing grouped sub-areas.

FIG. 7 represents another embodiment of the invention, where a encoded indicia 22 of binary type of the sub-area 24 mentioned above is sub-divided in such a manner that, as illustrated, $P_1 \sim P_4$, $P_5 \sim P_8$, $P_9 \sim P_{12}$ and $P_{13} \sim P_{16}$ are divided into $Q_1$, $Q_2$, $Q_3$, and $Q_4$ groups respectively, every groups having four elements. The four groups are then recorded in terms of four assemblies 30, according to this embodiment. The method of sub-division of said sixteen sub-areas 24 into total four groups and sequence of arrangement of the encoded indicia 22 represented in the assemblies 30 may be selected as may be found necessary: for example, they may be ($P_1$, $P_6$, $P_{11}$, $P_{16}/P_5$, $P_{10}$, $P_{15}$, $P_4/P_9$, $P_{14}$, $P_3$, $P_8/P_2$, $P_7$, $P_{12}$, $P_{13}$), ($P_1$, $P_5$, $P_9$, $P_{13},/P_{14}$, $P_{15}$, $P_{16}$, $P_{12}/P_8$, $P_4$, $P_3$, $P_2/P_6$, $P_{10}$, $P_{11}$, $P_7$), ($P_1$, $P_2$, $P_6$, $P_5/P_3$, $P_4$, $P_8$, $P_7/P_{11}$, $P_{12}$, $P_{16}$, $P_{15}/P_9$, $P_{10}$, $P_{14}$, $P_{13}$) etc. and some other types of combination as may be found appropriately.

The selection of individual addresses of sixteen sub-areas 24 or $P_1$, $P_2$, . . . , $P_{16}$ and the same of another sub-areas 24 to be choiced for individual groups $Q_1$, $Q_2$, $Q_3$, and $Q_4$ of the assemblies 30 permits a easier addition of cost information to the code of merchandise and ciphered expression of various cards and passwords etc., by changing properly through a microcomputer.

Figure 8A:
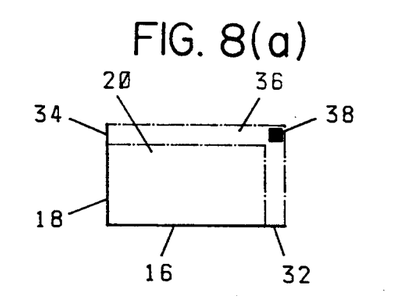
FIGS. 8(a) and 8(b) are illustrations of a representation area having an auxiliary mark according to another embodiment for the identification code sheet.
Figure 8B:
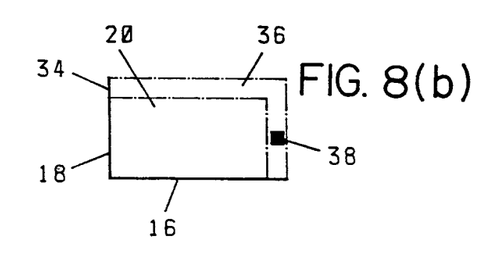

It is also to be noted that, in a representation area 20, is established an auxiliary representation area 36 defined by the extensions 32 and 34 of the X-axis and the Y-axis, as shown is in FIGS. 8 (a) and 8 (b), represententing an extension of the X-axis 16 and the Y-axis 18, and in a proper location in the said auxiliary area 36, for example the periphery of representation area 20, such as an area diagonal to point of intersection between the X-axis 16 and the Y-axis 18 as illustrated in FIG. 8 (a), in order to facilitate the recording an auxiliary mark 38 of a binary signal. As illustrated in FIG. 8(b), the mark is in the periphery of the representation area 20. The mark 38 needs not be limited to the rectangular shape as illustrated in FIG. 8 and may have some other shapes, such as round, star, plus, and minus symbols etc., as may be found necessary.

According to the embodiment stated above, identification of the reading direction by a sensor is made much easier and interpretation thereby more exact. Conventional coding are said to involve, in the case of bar code, a failure of reading where reading angle deviates 45° or more away from the standard. Unlike this, the embodiment according to the invention ensures stabilized interpretation at a high level of the accuracy, regardless of a directional deviation of pasting of the identification code sheet on the merchandise and the same of reading.

Figure 9:
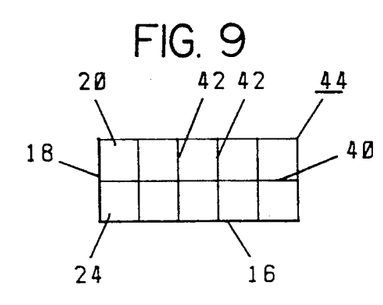
FIG. 9 shows a concept of a respresentation area having separation lines according to another embodiment.

FIG. 9 represents another embodiment of the invention, wherein the representation area 20 is sub-divided by horizontal sub-area separation lines 40 and vertical sub-area separation lines 42, with their separation marks 44 prited at regular intervals.

According to the embodiment mentioned above, sub-areas in representation area may be readily filled up, using a suitable pencil or the likes, to make marks of solid or round etc., and entry of the identification code at the site of operation etc., where the pasting of the identification code sheet and correction of entry having been made can be done with extreme ease, and legibility may be improved.

Figure 10:
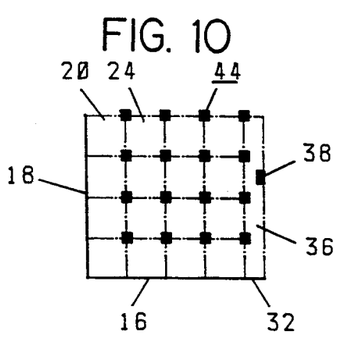
FIG. 10 is an illustration of representation area comprising separation marks, according to a still further embodiment of the invention.

FIG. 10 is further another embodiment of the invention, according to which the portions of intersection of horizontal sub-area sparation lines 40 with vertical sub-area separation lines 42 in the representation area 20 shown in FIG. 9 are identified with separation marks 44 as illustrated.

According to the embodiment represented by FIG. 10, a scope of the sub-area can be known by reading of said separation marks put at every intersection, which, in turn, ensure simplification and speed-up of the separation.

Figure 11:
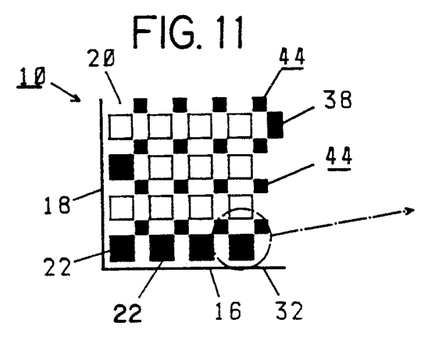
FIG. 11 and FIG. 12 show diagrams wherein encoded indicia are included.
Figure 12:
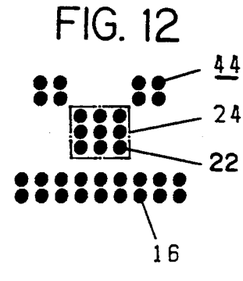
Figure 13A:
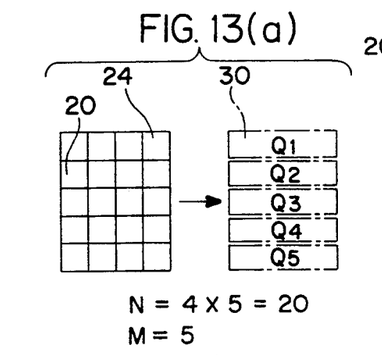
FIG. 13 and FIG. 14 give the patterns enabling establishment of both the sub-areas and assemblies of the representing area.
Figure 13B:
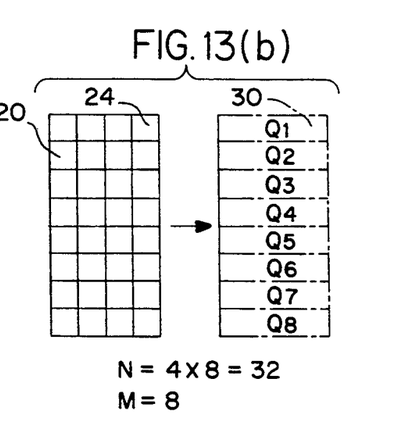
Figure 13C:
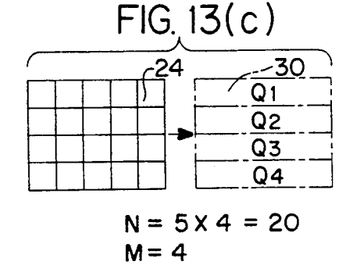
Figure 13D:
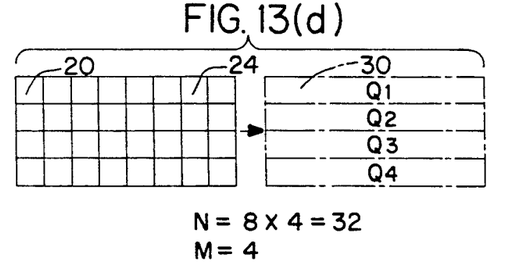

FIG. 11 and FIG. 12 are practical examples of the embodiment, respectively. In FIG. 11 there are printed, on the identification code sheet 10, representation areas 20 in form of crossed bars, and encoded indicia 22 and separation marks 44 in rectangular solid blacks, and in FIG. 12 are printed out the dots according to the allotment as illustrated, by means of the microcomputer's printer. Any representation most suitable for a printing means may be made according to the embodiments represented by FIG. 11 and FIG. 12.

For the foregoing embodiments, descriptions have been made relating only to sixteen sub-areas 24 of the representation area 20. Non the less, they are applicable, as may be found necessary, also to the sub-areas of twenty or thirty-two etc. which are multiples of four as represented in FIGS. 13 (a) and (b), or said sub-areas 24 of five, six, seven . . . etc. for every assemblies 30 as illustrated in FIGS. 13 (c) and (d).

It is also achievable, with embodiments stated above, to provide the numbers of the sub-areas as integer multiples of sixteen and the sames of the assemblies as integer multiples of four (or sames of groups as integer multiples of four). Assuming that the number of the sub-areas is $2^n$ and n is equal to five, or the same of the sub-areas is $2^5 = 32$, the characters can then be expressed, for a single identification code, in terms of combinations of 0000, . . . VVVV, or $2^{32} = 4.292968 \times 10^9$ which means a substantial rise in the coverage of the applicable number of the different characters. Furthermore, with n = 6, 7, . ' . . , the coverage of the applicable numbers of the characters different by a single identification code then becomes $2^{2n}$ which means a drastic expantion of the coverage mentioned in exponential function.

Figure 14:
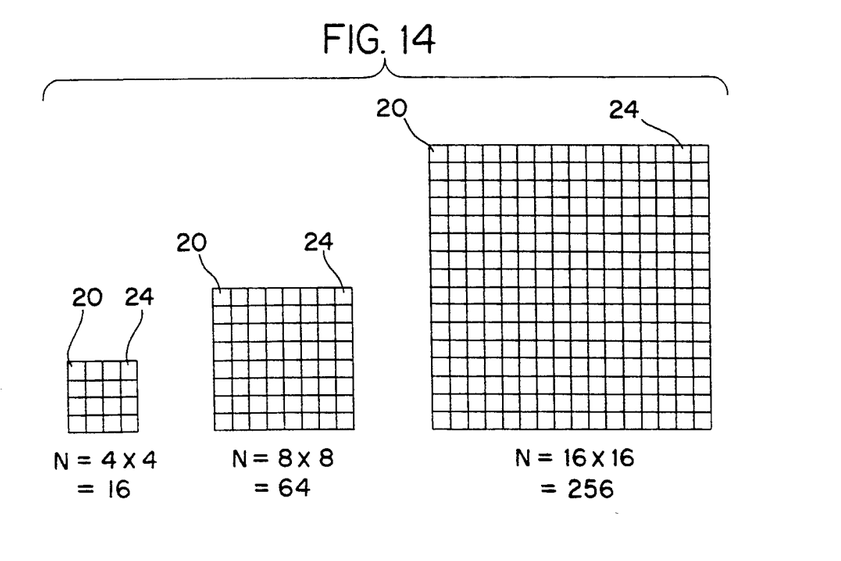

It is also achievable, with the said embodiment applied and the number of the assemblies expressed by $2^{n-m}$, to expand exponential-functionally the number of the assemblies by raising m, according to a rise of n. For the embodiments described, sub-areas are divided into four groups, with n = 4 and m = 2. With n = 5, for m = 2 ($2^2 = 4$), m = 3 ($2^3 = 8$), division into eight groups, besides four groups, may also be had. Where the number of sub- areas is sixty four, with n = 6, division into sixteen groups may also be made, with m = 4 ($2^4 = 16$), besides mentioned eight and/or sixteen groups, according to the embodiment represented by FIG. 14.

According to the identification code which the invention concerns, encoding may be had to cover the characters as many as $2^{16}=65536$, even with a low n number of only four, but presently JIS rule Kana-Kanzi codes cover only a small amount of the order of about 7,700 characters, so that it may be reasonably claimed that the embodiments mentioned have an sufficient enough capacity of encoding the speech symbols of Thai, Arabic, Chinese characters etc. and even the same of speech synthesis which have not yet been encoded, for the purpose of register and representation.

For the embodiments described, the identification code sheet has only to be able to be checked to see the presence of a binary signal code for individual sub-areas of representation areas. This means an applicability of paper of ordinary quality to the make of the said sheet and no need for use of a special paper of unusual cost designed for special application, unlike the case with conventinal type bar code. According to the embodiment of the invention, no problem will be encountered in using the identification code sheet, because of reading encoded indicia in the representation area, defined by both the X-axis, and the Y-axis, although the size of indicia may vary case by case.

The identification code sheet mentioned above may be applied also to the papers for name card, card, plastic film and the carton's sheet etc. besides ordinary paper.

The embodiment stated above involves the representation area and/or encoded indicia to be printed visibly on a paper, a film and a carton's sheet etc., sometimes with transparent magnetic ink. Printing made overlapping a prior printing of ordinary type enables the identification code readable as if reading were made for a plain print.

As noted, the representation area and the identification code should preferably be represented by printing or with magnetic ink, but conventional techniques of conventional punch-type signals are in no case excluded from an application to meet the similar need.

Figure 15:
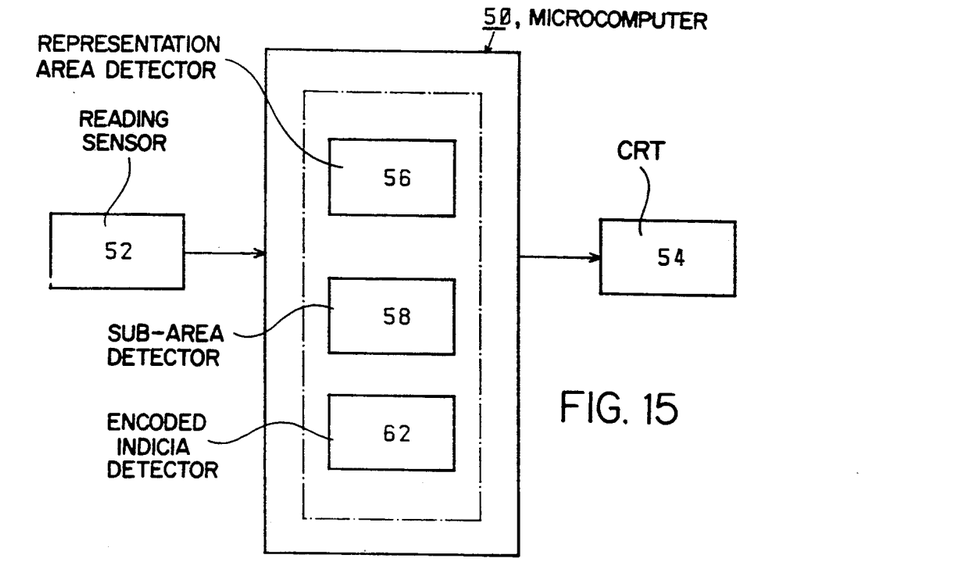
FIG. 15 and FIG. 16 show a block diagram illustrating a method of reading an identification code sheet according to the invention.
Figure 16:
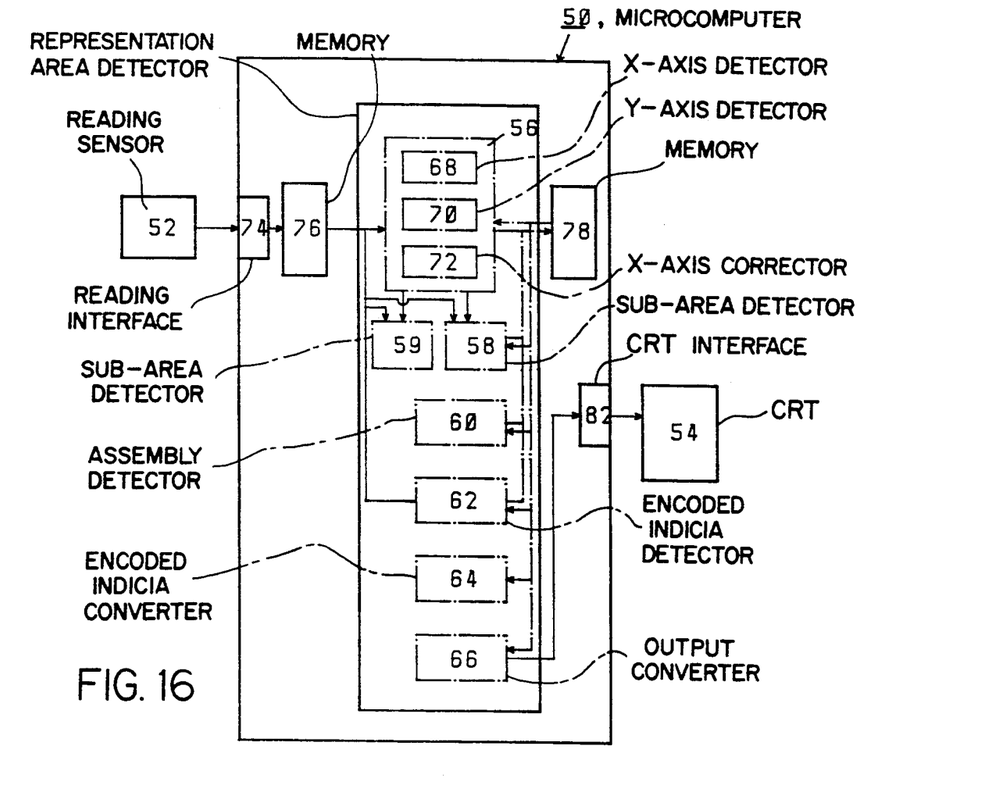
Figure 17:
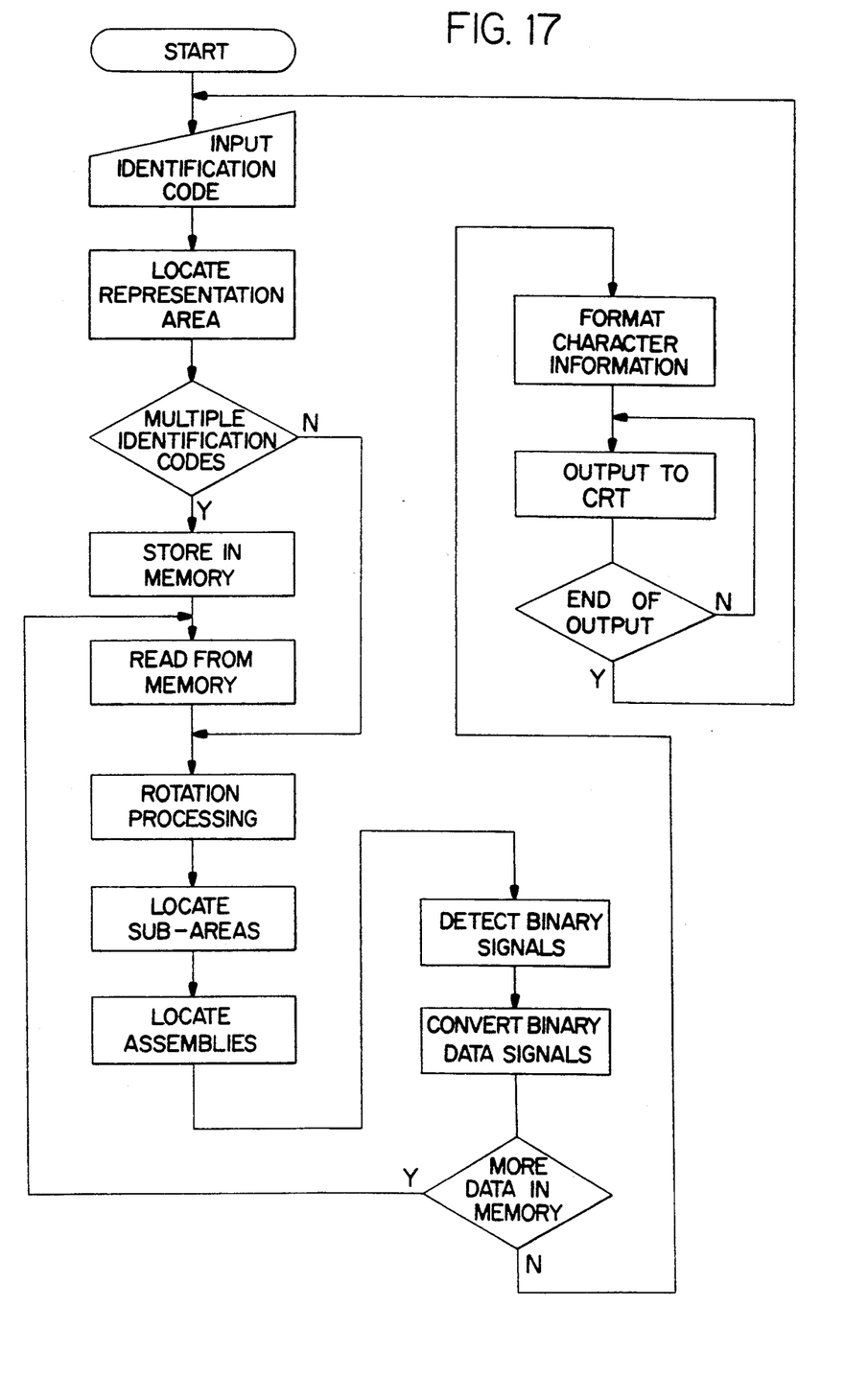
FIG. 17 is a flow chart showing a method of reading the identification code sheet according to the invention.

FIG. 15, FIG. 16 and FIG. 17 concern an example of the method of reading the identification code sheet 10 according to the invention.

To a microcomputer 50, as shown in FIG. 15 and FIG. 16, is connected a reading sensor 52 such as a bar code reader to read the representation area 20 and sub-areas 24 for signal input, followed by subsequent internal processing, the result thereof being displayed on an output means 54 of CRT or a printer having been connected as described later. As illustrated, said computer 50 comprises a means 56 of determining representation areas, a means 58 of determining sub-areas, a means 60 of determining assemblies, a means 62 of detecting presence of encoded indicia, a means 64 of converting the encoded indicia and a means 66 of converting codes for output means, the circuit thereof being set up by IC, LSI and the likes, respectively.

Said means 56 of determining representation areas is set up, as illustrated in FIG. 16, by a means 68 of determining the X-axis, a means 70 of determining the Y-axis and a means 72 of correcting a direction of X-axis in order to enable the detection of the representation area 20 of the identification code sheet 10 affected by input from the sensor 52 to read the identification code, through an interface 74 for reading the data and a means 76 of setting memories.

The means 58 of determining sub-areas serves to divide the data having been input according to setting by a means 78 of setting memories or the means 56 of determining representation areas, at a required interval and into a required number of the sections in the direction of both the X-axis and the Y-axis, and where separation marks 44 are present, to detect the marks 44 being followed by calculation for gaps between the marks and the X-Y axis to enable the division of the representation area 20 into the sub-areas 24 of a number as may be required.

The means 60 of determining the assemblies serves to group said sub-areas 24 into the assemblies 30 as required through a means 59 of detecting separation marks and determining sub-areas or the likes, according to setting by the means 78 of setting the memories and combining with address having been stored in a predetermined number of groups of sub-area 24.

The means 62 of detecting presence of binary signals is useful to find presence of binary signal marks 26 when the input proportional to predetermined area of said marks 26 having been input by graphic processing of sub-areas 24 is in a scope as required (for example, in case of an embodiment represented by FIG. 12, a total sum corresponding to four to nine dots) and absence of the same when not.

The means 64 of converting binary codes serves to determine an identification signal code through interpretation of presence of encoded indicia 22 of individual sub-areas 24, in order to transmit the same to the means 66 of converting code for the output unit. 82 stands for an interface for the output to the printer and CRT.

According to a manner described above, said interpretation is made, in pursuant to a flow chart shown in FIG. 17, one by one, to see the X-axis 16, the Y-axis 18 and the auxiliary mark or the marks 38 etc. of the identification code sheet 10 read by said sensor 52 through the means 56 of determining the representation areas, thus providing memories in suitable memory areas, in terms of bit image for a transmission of data of one or more as may be found necessary. Data having been so transmitted is then graphically processed for a rotation and a movement, depending on a means 72 of correcting a direction of the X-axis, and then allocation of both the sub-areas 24 and the assemblies 30 precedingly mentioned is made by said means 58 of determining sub-areas said means 60 of determining the assemblies respectively, in order to convert binary codes for preparation of a determined format to provide successive transmission to the output unit 54 of CRT or a printer. Calculation of extensions of both the X-axis and the Y-axis and auxiliary marks, made availing a graphic analysis, offers a fast determination of a direction of both the X-axis and the Y-axis, enabling graphic reversal or the likes as may be required.

Figure 18A:
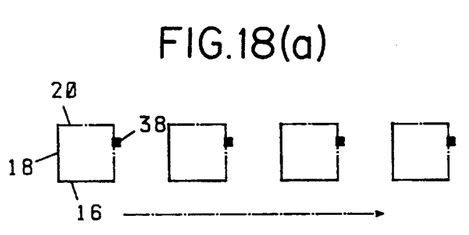
FIGS. 18(a), 18(b), 18(c) and 18(d) show concepts of an arrangement of the auxiliary mark or marks of another embodiment of the representation area according to the invention.
Figure 18B:
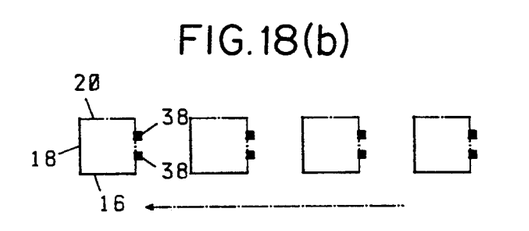
Figure 18C:
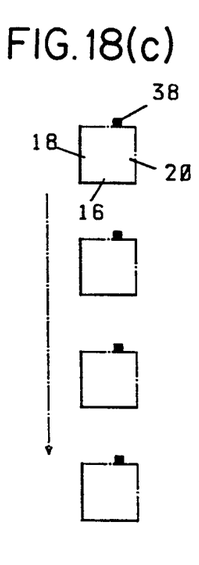
Figure 18D:
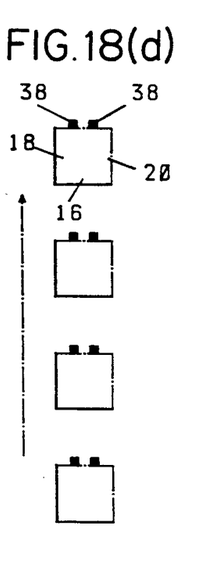

The embodiment mentioned involves a reading of an identification codes of the identification code sheet by properly moving a reading senser such as a bar senser: equivalent reading may be had by use of a surface senser to find a two dimensional size of A4, B5 and B6 etc., for which individual representation areas may be determined according a direction of both said X-axis and said Y-axis and location of said auxiliary mark or marks as precedingly mentioned, and a direction of character strings may also be determined, depending on the location and the number of said auxiliary marks. For example, in case where, in the pheriphery of the Y-axis 18 of the representation area 20, is provided a single auxiliary mark 38, reading may proceed rightwards according to an arrow, and in another case where two auxiliary marks 38 are printed, reading may proceed leftwards according to another arrow, as shown in FIGS. 18(a), and (b). And in still another case where, depending on the X-axis 16 of representation area 20, is printed the single auxiliary mark 38, reading may proceed downwards according to an arrow, and in further still another case where double auxiliary marks 38 are printed, the reading then proceed upwards according to an arrow, as shown in FIGS. 18(c) and (d).

The location and the numbers of the auxiliary marks may also be used as a signal for determining a combination of the sub-areas composing an assembly.

Figure 19A:
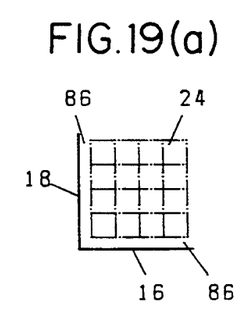
FIGS. 19(a), 19(b) and 19(c) give concepts of further another embodiment of the representation area having gaps according to the invention.
Figure 19B:
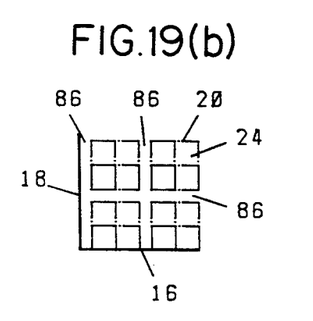

Furthermore, as illustrated in FIGS. 19(a) and (b), a disposition of gaps 86, both vertical and horizontal, to between said sub-areas 24 in the representation area 20 enables a clear distinction of said sub-areas 24 from both the X-axis 16 and the Y-axis 18 and operation of said representation area 20 at an improved level of accuracy, even if encoded indicia 22 of black solid dot have been put both horizontally and vertically, in all the sub-areas 24 arranged, the marks 44 and said encoded indicia 22 then being discontinuous, thus demonstrating a substantial preferability for accurate operation.

It should, however, be noted that it is possible to cause discrimination of a straight line of a series of said encoded indicia 22 from both axes X and Y, by interposing gaps 86 of blank area between the X-axis 16 and the sub-area 24 next thereto and between the Y-axis 18 and said sub-areas 24 next thereto, and that an intermitent disposition of said gaps 86 of blank area as illustrated in FIG. 19 ensures both good result of finding, at an increased accuracy and simplicity interpretation of the representation area at an improved ease.

Figure 19C:
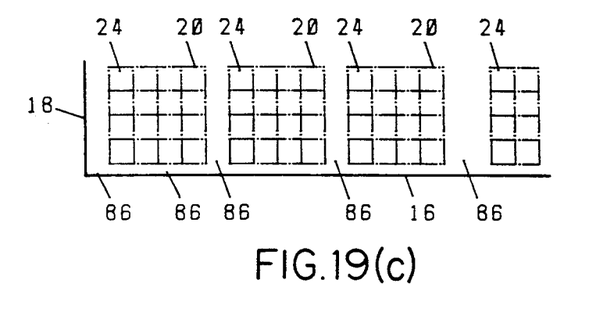

FIG. 19(a) represents an embodiment of the invention where gaps 86 are located next to both the X-axis 16 and Y-axis 18 mentioned as illustrated in FIG. 19(b), and said gaps 86 may be located in between the sub-areas 24 and further be used for instruction of direction of reading a character string or for the same of combination of the sub-areas setting up an assembly, by use of gaps as a signal in place of an auxiliary mark or marks, through a proper change of the location and numbers of said gaps 86. Further, binary codes may be printed, in a single representation area, for a plurality of Kana-Kanzi letters, by interposing a split for every $2^n$ sub-areas as shown in FIG. 19(c).

Figures 20A, 20B:
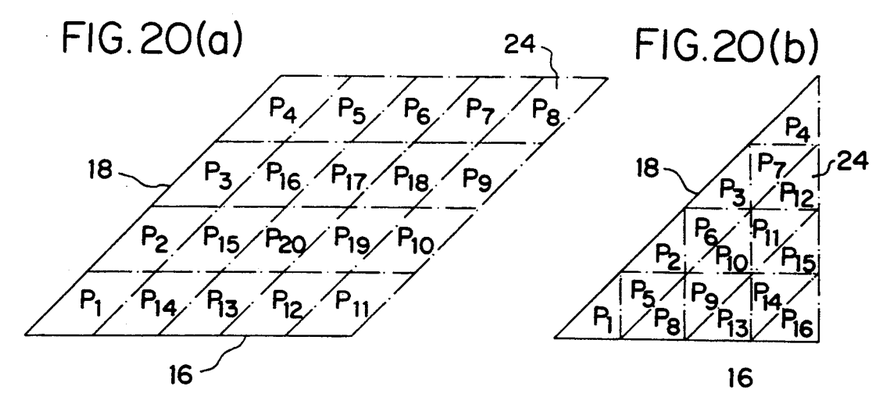
FIGS. 20(a), 20(b), 20(c) and 20(d) show various embodiments where the X-axis and the Y-axis are arranged skew relative to each other, representing still further another embodiment of the invention.
Figures 20C, 20D, 20E:
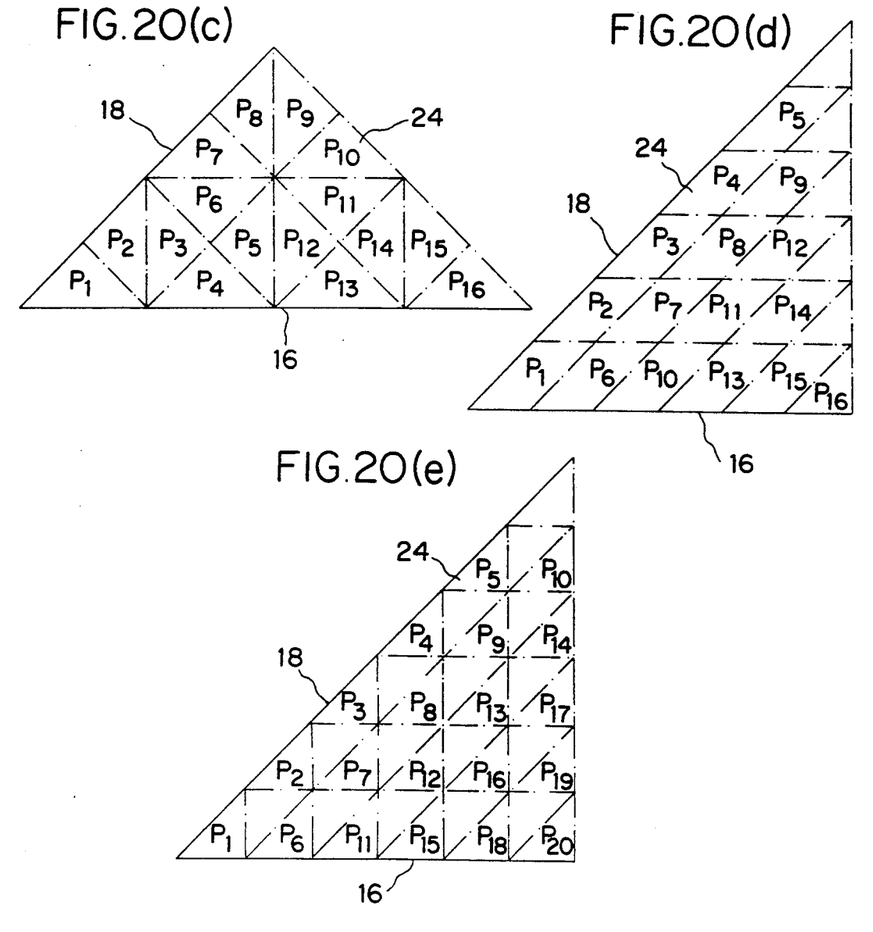

In the embodiments described, the X-axis and the Y-axis are arranged in mutual orthgonality, but they may be disposed intersected at a suitable angle as exampled in FIGS. 20(a), (b), (c) and (d), and moreover they may have any shapes other than a rectangle.

All the embodiments described precedingly concern a processing in form of a single task to perform a computer processing, but may also ensure a higher speed of input of a sensor output to memory areas, the operation and the output in a multitask system.

Various embodiments have been described precedingly merely to aid the understanding of the invention, and variations may be made by one skilled in the art without departing from the spirit and the essential features of the invention, being not limited to the specific embodiments mentioned.

What is claimed is:

1. A method for reading and processing an identification code, comprising the steps of:
   a) providing a representation area on an object including,
      a computer readable orientation border, positioned within said representation area on at least two sides,
      a plurality of sub-areas in which encoded indicia are located,
      orthogonal rows and columns of separation marks, separating said plurality of sub-areas, and
      a nonsymmetric auxiliary representation mark, provided within said representation area such that said representation area is defined by an area enclosed by said computer readable orientation border and said nonsymmetric auxiliary representation mark,
   b) reading said plurality of sub-areas in which the encoded indicia are located and said orthogonal rows and columns of separation marks, with a reading apparatus, and generating data signals representative of the encoded indicia;
   c) detecting said computer readable orientation border and said nonsymmetric auxiliary representation mark, determining a scanning direction and an angle of orientation of said identification code with respect to the reading apparatus, and generating a scanning direction signal and an angle of orientation signal;
   d) correcting the data signals generated in step (b) depending on the scanning direction signal and angle of orientation signal generated in step (c), in order to produce corrected signals; and
   e) translating the corrected data signals into character information, represented by the encoded indicia.

2. The method of claim 1, wherein a number of said plurality of sub-areas is sixteen.

3. The method of claim 2, wherein the sixteen sub-areas are divided into four or more assemblies.

4. The method of claim 1, wherein the representation area is in the shape of a parallelogram.

5. The method of claim 4, wherein the representation area is in the shape of a square.

6. The method of claim 1, wherein the representation area is in the shape of a right triangle.

* * * * *